United States Patent [19]

Baer

[11] 4,134,264
[45] Jan. 16, 1979

[54] DOUBLE BUBBLE WHEEL ENGINE

[76] Inventor: Stephen C. Baer, P.O. Box 422 (W. Ella Rd.), Corrales, N. Mex. 87048

[21] Appl. No.: 758,992

[22] Filed: Jan. 17, 1977

[51] Int. Cl.$^2$ .............................................. F03G 3/00
[52] U.S. Cl. ....................................... 60/516; 60/531; 60/675; 60/721
[58] Field of Search ................. 60/675, 530, 531, 517, 60/525, 526, 516

[56] References Cited

U.S. PATENT DOCUMENTS 4,051,678  10/1977  Yates ...................................... 60/675

Primary Examiner—Allen M. Ostrager

[57] ABSTRACT

A heat engine that rotates on a shaft set at an angle to the lines of force of a gravitational or centrifugal field. Elongated chambers (divers) are arranged radially and about the shaft with their long axes parallel to the shaft. There are an equal number of hot and cold divers. Each cold diver connects through its base, so a liquid may flow between, with other cold divers located about the shaft. Each hot diver connects through its base, so liquid may flow between, with other hot divers located about the shaft. Each cold diver is connected from its top, so that gas may pass between, through a suitable regenerator to the top of one warm diver. The so-connected pairs of divers are arranged so that the warm diver is always ahead of the cold diver some phase angle 19 radially about the shaft. The divers are filled approximately ½ full of liquid and ½ full of a gas. As the shaft turns the phase angle causes the gas to flow from warm to cold to warm diver. The expansion of the gas in the hot diver pushes the majority of liquid to the other side of the shaft. The gravitational or centrifugal field causes a turning motion. Heat may also be pumped from a cold source to a hot source by turning the engine backwards.

2 Claims, 2 Drawing Figures

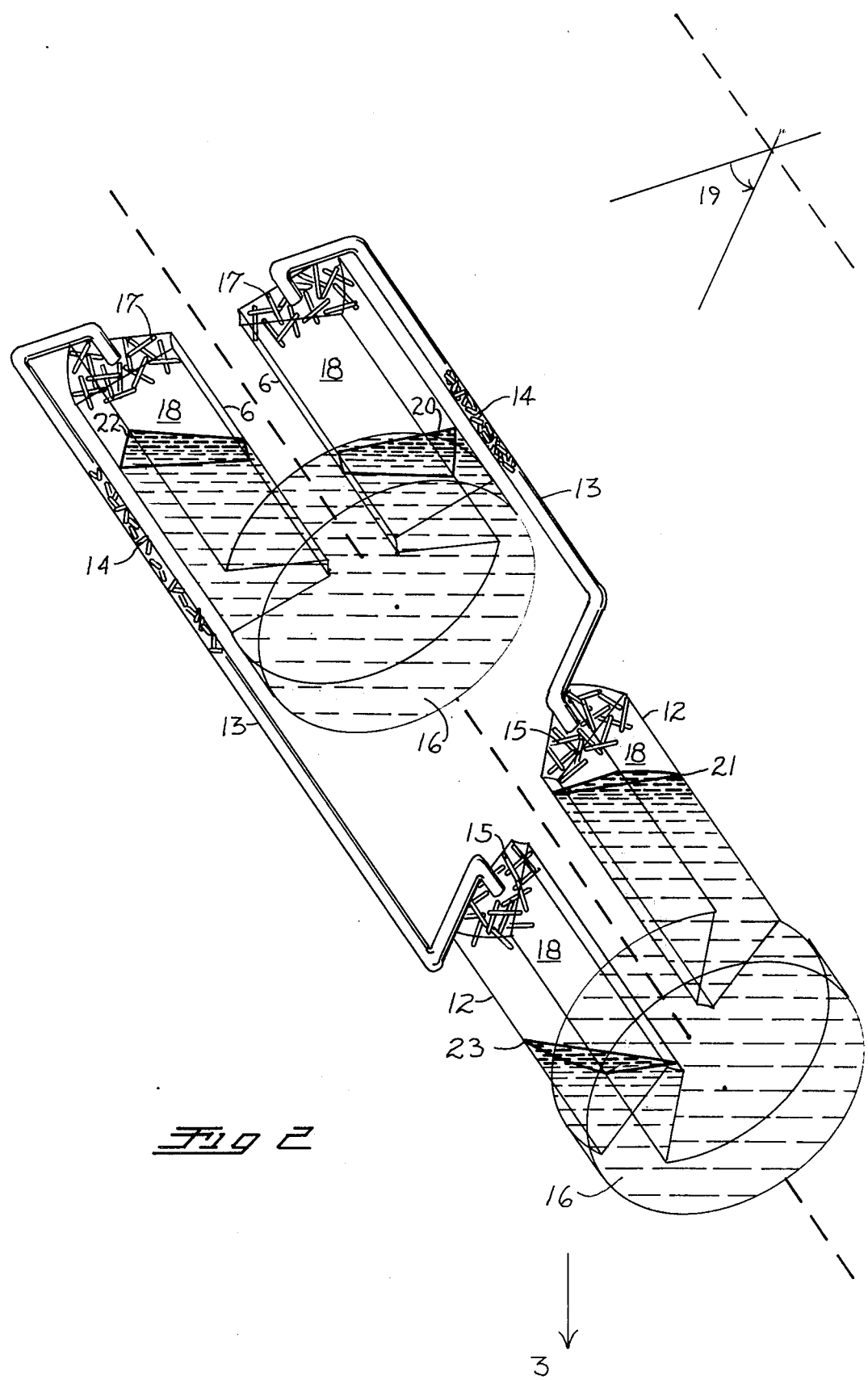

DOUBLE BUBBLE WHEEL ENGINE

BACKGROUND OF THE INVENTION

1. Field of the Invention

The invention is a mechanism for transforming thermal energy to mechanical energy and mechanical energy to thermal energy.

2. Description of the Prior Art

In prior art, most devices which convert thermal energy to mechanical energy, such as the internal combustion engine, are complex, designed to have low weight to power ratios, high temperatures, and high rotating velocities. As a result they have short lives, thermodynamic limitations, and require special fuels or energy sources. The present invention can be designed to accept heat energy from a variety of sources such as solar, burning of fuel, and waste heat energy from other types of devices. Also the entire engine rotates as one piece.

SUMMARY

The invention is a device for converting thermal energy into mechanical energy. Pairs of chambers (drivers), one hot and one cold are connected with an intermediate regenerator so that a bubble of gas may pass from hot diver to cold diver through the regenerator. The divers are arranged about an axle so that as the engine turns the bubbles pass from hot to cold to hot divers. The alternating expansion and contraction of the bubbles keeps the majority of liquid always on one side of the axle. The imbalance causes the engine to turn in a gravitational or centrifugal field. The cycle that powers the engine depends on the liquid, or liquids in the engine and the gas or gasses in the bubble. A liquid with a relatively low vapor pressure, such as a low viscosity oil, and a high pressure bubble of a gas different than the vapor of the liquid, such as air, causes a cycle similar to that of a Stirling engine. A liquid with a relatively high vapor pressure, such as water, and a relatively low pressure of gas different than the vapor of the liquid, such as air, causes a cycle like that of a Rankine engine.

One object of the invention is to build a device that can economically use a variety of heat sources, such as burning a fuel, solar energy or waste heat from other applications. Another objective of the invention is to build a device that moves as one part, but which is capable of collecting and storing heat and cold for its own operation. A further objective of the invention is to build a device in which it is easy to arrange surfaces such that there is excellent heat transfer to and from the working gas bubble. A final objective of the invention is to build a device that can easily be used as a heat pump or refrigerator. It is obvious that the engine, or multiples of the engine, can be arranged so that as they spin about their own axes, they rotate the arrangement about an external axis so as to create a centrifugal field to increase the power output.

BRIEF DESCRIPTION OF DRAWINGS

FIG. 2 is a diagram of the engine showing the principal of operation of the engine.

DESCRIPTION OF THE PREFERRED EMBODIMENT

Figure 1:
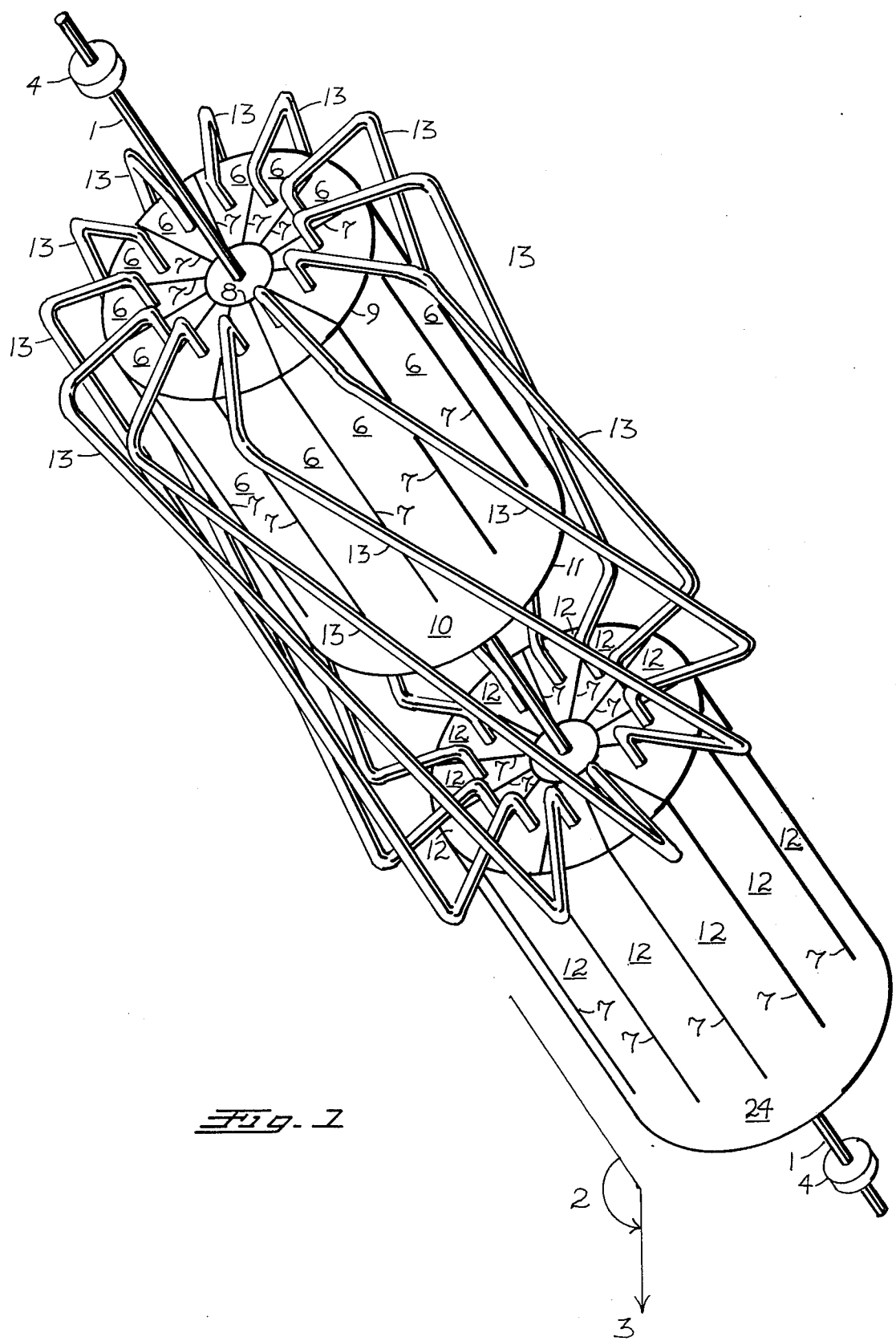
FIG. 1 is an isometric view of the invention.

Referring to the drawings, FIG. 1 shows an engine fastened to a shaft 1 making an angle 2 with the gravitational field 3 and mounted on bearings 4. Divers 6 are elongated radial sections formed by baffles 7 that divide the volume between an inside wall 8 and an outside wall 9 into twelve sections. The top set of divers 6 is designated cold, and the lower set of divers 12 is designated hot. A connecting plenum 10 for liquid flow between the like temperature divers 6 exists in the space below the baffles 7 and above a base plate 11 which seals the inside wall to the outside wall. The set of hot divers 12 and plenum 24 are constructed identically to the set of cold divers 6. The connecting tubes 13 join the top of the cold divers 6 to the top of the hot divers 12. The phase angle 19 between the cold diver 6 and the hot diver 12 so connected being sixty degrees. The divers 6 and plenum 10 are filled so that the divers are half full of liquid 16 and the remaining volume in the divers and tubes are filled with gas 18. The hot divers 12 and plenum 24 are filled in the same manner. FIG. 2 is a diagram of a pair of cold divers 6, one-hundred-eighty degrees apart and the hot divers 12 to which cold divers 6 are connected by means of tubes 13.

A regenerator 14, which may be composed of metal fibers or other suitable materials, is shown positioned in the tube 13 for the purpose of storing heat transferred from the gas 18 as it leaves the hot diver 12 and for storing the cold transferred from the gas 18 as it leaves the cold diver 6.

A heat exchanger 15 which may be composed of plastic or metal plates or fibers or other suitable material, is shown at the top of the hot diver 12. The heat exchanger 15 if flooded by liquid 16 each time the hot diver 12 fills. The large surface area of the exchanger 15 insures good heat transfer to the gas 18 as it flows back into the hot diver 12. An identical heat exchanger 17 is placed at the top of each cold diver 6 for the purpose of cooling the gas 18.

Any liquid and any gas may be used so long as they are not corrosive to the engine. Water and air are suitable.

In operation, heat is applied to the hot divers 12 and plenum 10 of the hot divers 12. The gas 18 is free to pass through the connecting tube 13 in response to differing pressures from the liquid 16 in the two connected divers 12 and 6. If the phase angle 19 separating the connected divers 12 and 6 about the shaft 1 is zero, there is no flow of gas 18 between the two divers 12 and 6 as the engine turns. If there is a phase angle 19, then for one-hundred-eighty degrees, the hot diver 12 is relatively lower than the cold diver 6 and the hot diver 12 tends to fill with liquid 16. The next one-hundred eighty degrees the hot diver 12 is relatively higher than the cold diver 6 and the cold diver 6 tends to fill with liquid 16. The phase angle 19 thus produces the flow of gas 18 back and forth between hot and cold divers.

Referring to FIG. 2, it is shown from the liquid levels 20 and 21 in the higher pair of connected divers 12 and 6 where the gas 18 is largely in the cold diver 6, the total volume of liquid 16 in the higher divers 12 and 6 is relatively large compared to the total volume of liquid 16, a shown by liquid levels 22 and 23, contained in the lower connected divers 12 and 6 where the gas 18 is largely in the hot diver 12. The greater quantity of liquid 16 contained in the upper divers 12 and 6 than in the lower divers 12 and 6 acted upon by the gravitational or centrifugal field 3 causes a turning motion of the entire engine. The heat exchangers 15 and 17 are situated in the divers 12 and 6 to be flooded with liquid 16 on each turn and thus provide ample heat transfer to the gas 18. The cold divers 6 are cooled by sky radiation, or convective air cooling to remove waste heat from the engine.

I claim:
1. An engine comprising:
   a. a rotatable shaft mounted on bearings and inclined with respect to the gravitational or centrifugal field,
   b. a plurality of hot divers rigidly fixed to the shaft and interconnected with one another at their lower ends,
   c. a plurality of cold divers rigidly fixed to the shaft and interconnected with one another at their lower ends,
   d. a plurality of tubes each connecting the top of one cold diver to the top of one hot diver, wherein the so-connected divers are separated by a phase angle with respect to the shaft,
   e. a plurality of heat regenerators situated so as to regenerate the flow of different temperature gasses passing through the interconnecting tubes,
   f. a heat exchanger of large surface area at the top of each diver,
   g. a fluid filling each plenum connecting the divers and partially filling each diver,
   h. a means for heating the fluid in the hot divers,
   i. a means for cooling the cold divers,
   j. a gas filling the volume of the divers and connecting tubes not occupied by the working fluid.
2. The engine of claim 1 powered by mechanical energy and used to pump heat from a cold source to a hot sink.

* * * * *